(12) United States Patent
Funato

(10) Patent No.: US 10,001,190 B2
(45) Date of Patent: Jun. 19, 2018

(54) CYLINDER DEVICE

(71) Applicant: KYB Corporation, Tokyo (JP)

(72) Inventor: Hiroshi Funato, Gifu (JP)

(73) Assignee: KYB Corporation, Tokyo (JP)

( * ) Notice: Subject to any disclaimer, the term of this patent is extended or adjusted under 35 U.S.C. 154(b) by 0 days. days.

(21) Appl. No.: 15/124,189

(22) PCT Filed: Mar. 30, 2015

(86) PCT No.: PCT/JP2015/059902
§ 371 (c)(1),
(2) Date: Sep. 7, 2016

(87) PCT Pub. No.: WO2015/156160
PCT Pub. Date: Oct. 15, 2015

(65) Prior Publication Data
US 2017/0016507 A1    Jan. 19, 2017

(30) Foreign Application Priority Data

Apr. 8, 2014 (JP) ................................ 2014-079447

(51) Int. Cl.
*B60G 11/54* (2006.01)
*F16F 9/58* (2006.01)

(52) U.S. Cl.
CPC ..................... *F16F 9/58* (2013.01)

(58) Field of Classification Search
CPC ................. F16F 9/16; F16F 9/58; F16J 15/26
USPC ................. 267/219, 220, 139, 140; 188/315, 188/322.16–322.18
See application file for complete search history.

(56) References Cited

U.S. PATENT DOCUMENTS

| 1,413,409 | A | * | 4/1922 | Lackman | F16J 9/16 277/446 |
| 2,047,590 | A | * | 7/1936 | Madsen | F16J 9/16 277/489 |
| 2,910,332 | A | * | 10/1959 | Madsen | F16J 9/14 277/446 |
| 6,045,135 | A | * | 4/2000 | Feistel | F16J 9/16 277/434 |
| 6,318,237 | B1 | * | 11/2001 | Muller | F15B 15/261 91/41 |

(Continued)

FOREIGN PATENT DOCUMENTS

| EP | 1375958 A2 | 1/2004 |
| JP | S57-035534 U | 2/1982 |

(Continued)

*Primary Examiner* — Christopher P Schwartz
(74) *Attorney, Agent, or Firm* — Rabin & Berdo, P.C.

(57) ABSTRACT

A cylinder device includes an annular cushion ring that prevents collision between the cylinder head and the rod head at stroke end during contraction. The cushion ring is formed by linking a plurality of ring segments in a circumferential direction so as to have an annular shape. The ring segments have a main body portion and linkage portions formed on both ends of the main body portion in the circumferential direction, the linkage portions linking the neighboring ring segments. The linkage portions of the neighboring ring segments are mutually overlapped in an axial direction of the cushion ring and linked such that relative movement in a radial direction of the cushion ring is restricted.

10 Claims, 7 Drawing Sheets

(56) References Cited

U.S. PATENT DOCUMENTS

| | | | |
|---|---|---|---|
| 6,439,578 B1* | 8/2002 | Radcliffe | F16J 15/24 |
| | | | 277/434 |
| 9,033,636 B2* | 5/2015 | Burgman | F16B 21/186 |
| | | | 411/517 |
| 9,638,326 B2* | 5/2017 | Haynes | F16J 15/26 |
| 2007/0013147 A1* | 1/2007 | Granquist | B30B 11/002 |
| | | | 277/632 |
| 2008/0272552 A1* | 11/2008 | Zheng | F16J 15/442 |
| | | | 277/400 |
| 2009/0179386 A1* | 7/2009 | Lindner-Silwester | F16J 9/14 |
| | | | 277/486 |
| 2015/0167846 A1* | 6/2015 | Haynes | F16J 15/442 |
| | | | 277/350 |

FOREIGN PATENT DOCUMENTS

| | | |
|---|---|---|
| JP | S62-172854 U | 11/1987 |
| JP | H09-60683 A | 3/1997 |
| NL | 1038900 C | 1/2013 |

* cited by examiner

CYLINDER DEVICE

TECHNICAL FIELD

The present invention relates to a cylinder device that is used as a shock absorber and an actuator.

BACKGROUND ART

JP1997-60683A discloses a shock absorber including a bump cushion rubber 10A that absorbs impact by interacting against a dumper main body and undergoing deformation when a piston rod 2 is subjected to a sudden change in vehicle load or to the impact and is compressed with respect to a dumper main body 1.

SUMMARY OF INVENTION

A first cushion rubber member 12 of the bump cushion rubber 10A described in JP1997-60683A has a cylindrical shape, and the piston rod 2 is inserted into an axial core hole 12a thereof. Therefore, in a case in which the first cushion rubber member 12 is damaged and needs to be replaced, the shock absorber has to be disassembled.

An object of the present invention is to provide a cylinder device including a cushion ring that can be replaced easily.

According to one aspect of the present invention, a cylinder device in which a piston rod is inserted into a cylinder so as to be movable back and forth is provided. The cylinder device includes: a cylinder head provided on an end portion of the cylinder, the piston rod being slidably inserted through the cylinder head; a rod head that is provided on an end portion of the piston rod, the end portion being outside the cylinder; and an annular cushion ring mounted on the piston rod so as to prevent collision between the cylinder head and the rod head at stroke end during contraction of the cylinder device. The cushion ring is formed by linking a plurality of ring segments in a circumferential direction so as to have an annular shape. The ring segments have a main body portion and linkage portions formed on both ends of the main body portion in the circumferential direction, the linkage portions linking the neighboring ring segments. The linkage portions of the neighboring ring segments are mutually overlapped in an axial direction of the cushion ring and linked such that relative movement in a radial direction of the cushion ring is restricted.

DESCRIPTION OF EMBODIMENT

A cylinder device according to an embodiment of the present invention will be described below with reference to the drawings.

In the following, a case in which the cylinder device is a shock absorber 100 installed on a vehicle will be described.

The shock absorber 100 is a device that suppresses vibration of a vehicle body by generating damping force by, for example, being interposed between the vehicle body and an axle shaft of the vehicle.

Figure 1:
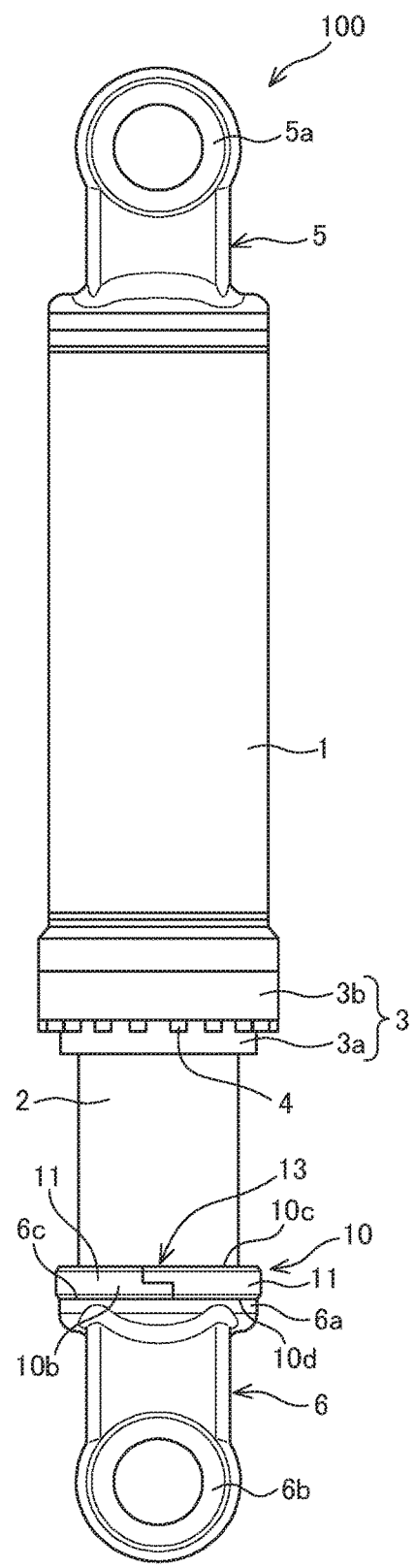
FIG. 1 is a front view of a cylinder device according to an embodiment of the present invention.

As shown in FIG. 1, the shock absorber 100 includes a cylinder 1 and a piston rod 2 that is inserted into the cylinder 1 so as to be freely movable back and forth. In this embodiment, as shown in FIG. 1, the shock absorber 100 is installed on the vehicle in an orientation in which the cylinder 1 is positioned at the upper side and the piston rod 2 is positioned at the lower side.

The piston rod 2 is connected, at the one end portion thereof, to a piston that is slidably inserted into the cylinder 1, and the other end portion of the piston rod 2 extends outside the cylinder 1.

The interior of the cylinder 1 is partitioned by the piston into an expansion-side chamber and a contraction-side chamber. The expansion-side chamber and the contraction-side chamber are filled with working oil serving as working fluid. In addition, an gas chamber is provided in the cylinder 1 for compensating for volume change in the cylinder 1 due to inward and outward movement of the piston rod 2 relative to the cylinder 1.

A cylinder head 3 into which the piston rod 2 is slidably inserted is provided on an end portion of the cylinder 1. The cylinder head 3 has a cylindrical main body portion 3a and a flange portion 3b having a larger diameter than the main body portion 3a. The cylinder head 3 is fixed to the cylinder 1 by fastening the flange portion 3b to the end portion of the cylinder 1 via bolts 4. On an inner circumferential surface of the main body portion 3a of the cylinder head 3, a bearing that supports the piston rod 2 so as to be movable in the axial direction and a seal member that prevents leakage of the working oil in the cylinder 1 are provided.

A bottom member 5 is connected at the end portion of the cylinder 1 on the opposite side from the cylinder head 3. The bottom member 5 has an attachment portion 5a for attaching the shock absorber 100 to the vehicle.

A rod head 6 is provided on an end portion of the piston rod 2 on a side extending out from the cylinder 1. The rod head 6 has a stopper portion 6a that is formed to have a larger diameter than the piston rod 2 and defines a stroke end during contraction of the shock absorber 100 and an attachment portion 6b for attaching the shock absorber 100 to the vehicle.

The shock absorber 100 also includes an annular cushion ring 10 that prevents collision between the cylinder head 3 and the rod head 6 at the stroke end during the contraction of the shock absorber 100. The cushion ring 10 is an elastic member, and more specifically, the cushion ring 10 is made of high-hardness rubber.

The cushion ring 10 is mounted so as to come into close contact with the outer circumferential surface of the piston rod 2, and is provided on an annular flat-surface portion 6c of the stopper portion 6a of the rod head 6.

In the following, the cushion ring 10 will be described in detail with reference to FIGS. 2 to 4.

The cushion ring 10 is formed to have an annular shape by linking a plurality of ring segments 11 in the circumferential direction. In this embodiment, a case in which the cushion ring 10 is constituted of three ring segments, and each of the ring segments 11 has the same shape will be described. FIG. 2 shows a perspective view of the cushion ring 10, FIG. 3 shows a perspective view of the ring segments 11, and FIG. 4 shows a sectional view of the cushion ring 10.

The cushion ring 10 has an inner circumferential surface 10a that is formed so as to come into close contact with the outer circumferential surface of the piston rod 2, an outer circumferential surface 10b that is formed so as to have substantially the same outer diameter as that of the stopper portion 6a of the rod head 6, an annular contact surface 10c that can be brought into contact with an end surface of the main body portion 3a of the cylinder head 3, and an annular mounting surface 10d that contacts the stopper portion 6a of the rod head 6. The inner diameter and the outer diameter of the cushion ring 10 are constant over the entire circumference. In addition, the contact surface 10c and the mounting surface 10d forming both end surfaces of the cushion ring 10 have flat surfaces.

The ring segments 11 are arc-shaped members, and each has a main body portion 12 and linkage portions 13 that are respectively formed on both ends of the main body portion 12 in the circumferential direction and that link neighboring ring segments 11.

The linkage portions 13 are formed of a first linkage portion 13a and a second linkage portion 13b. The first linkage portion 13a is formed so as to extend from a first end surface 12a of the one of both ends of the main body portion 12 in the circumferential direction and to be continuous with the contact surface 10c of the cushion ring 10. The second linkage portion 13b is formed so as to extend from a second end surface 12b of the other of both ends of the main body portion 12 in the circumferential direction and to be continuous with the mounting surface 10d of the cushion ring 10. The first linkage portion 13a and the second linkage portion 13b are formed to have the thickness that is substantially half of the thickness of the main body portion 12. Thus, the first linkage portion 13a and the second linkage portion 13b are respectively formed as steps with respect to the main body portion 12. The first linkage portion 13a and the second linkage portion 13b have the same length in the circumferential direction.

A groove portion 15a (a first groove portion) extending in the circumferential direction is formed on a first linkage surface 14a at the opposite side from the contact surface 10c of the first linkage portion 13a. In addition, a ridge portion 15b (a first ridge portion) extending in the circumferential direction is formed on a second linkage surface 14b at the opposite side from the mounting surface 10d of the second linkage portion 13b.

Two ring segments 11 are linked by fitting the groove portion 15a of the first linkage portion 13a of the one of the ring segments 11 to the ridge portion 15b of the second linkage portion 13b of the other of the ring segments 11, thereby bringing the first linkage surface 14a and the second linkage surface 14b into contact. As described above, by fitting the groove portion 15a to the ridge portion 15b, the first linkage portion 13a and the second linkage portion 13b of the neighboring ring segments 11 are mutually overlapped in the axial direction of the cushion ring 10 and linked such that their relative movement in the radial direction of the cushion ring 10 is restricted.

Figure 2:
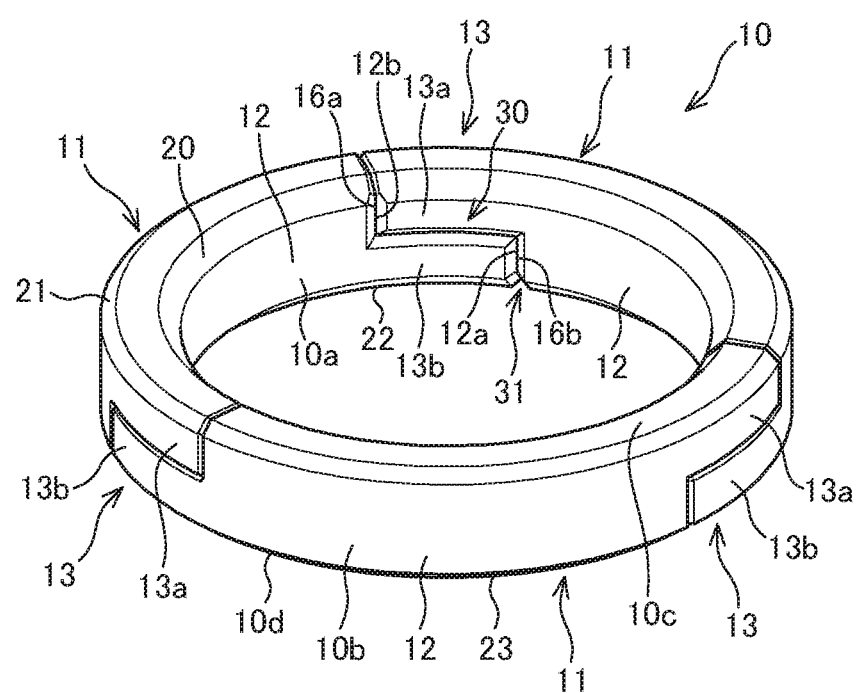
FIG. 2 is a perspective view of a cushion ring.

In addition, as shown in FIG. 2, the neighboring ring segments 11 are linked in a state in which an end surface 16a of the first linkage portion 13a of the one ring segment 11 faces against the second end surface 12b of the main body portion 12 of the other ring segment 11 such that there is almost no gap, and in a state in which the first end surface 12a of the main body portion 12 of the one ring segment 11 faces against an end surface 16b of the second linkage portion 13b of the other ring segment 11 such that there is almost no gap.

Chamfers 20 and 21 are formed at an inner circumference edge and an outer circumference edge of the contact surface 10c of the cushion ring 10, respectively, and chamfers 22 and 23 are formed at an inner circumference edge and an outer circumference edge of the mounting surface 10d, respectively.

Figure 3:
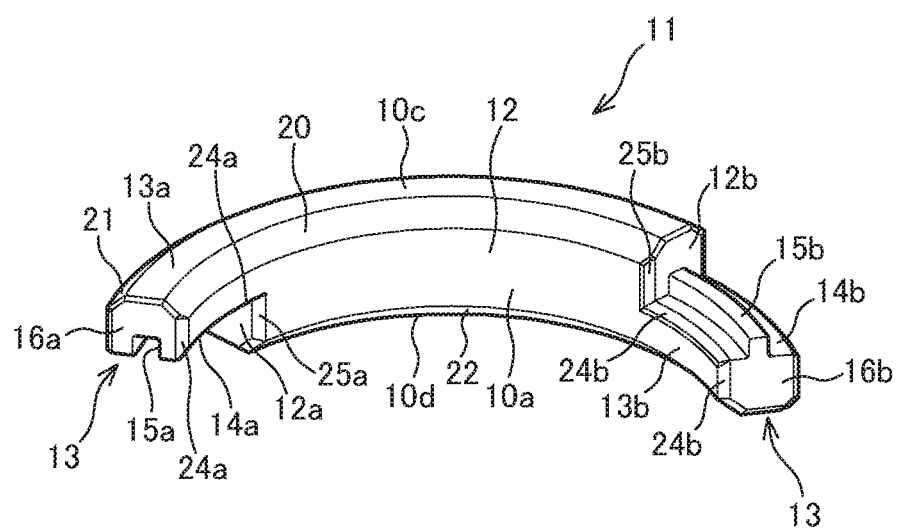
FIG. 3 is a perspective view of ring segments.
Figure 4:
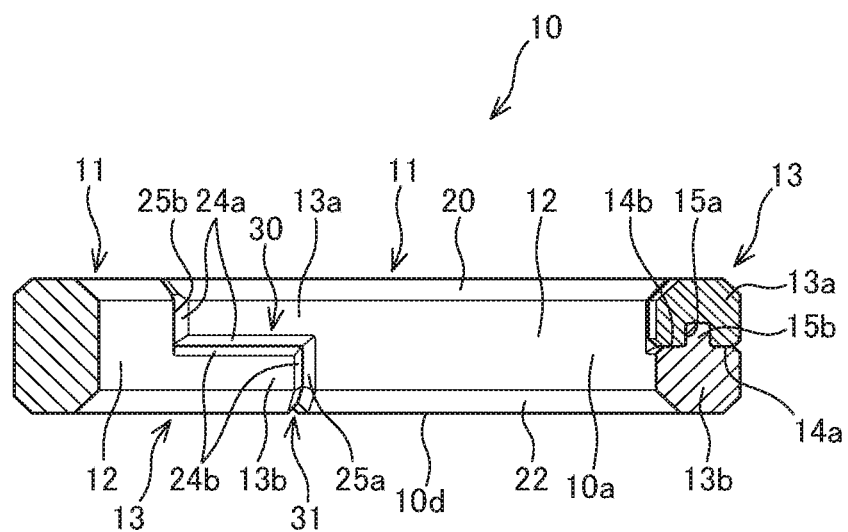
FIG. 4 is a sectional view of the cushion ring.

As shown in FIGS. 3 and 4, chamfers 24a are formed at corner portions of the first linkage portion 13a. Specifically, the chamfers 24a are formed at corner portions of the end surface 16a and the first linkage surface 14a. Similarly, chamfers 24b are also formed at the second linkage portion 13b. Specifically, the chamfers 24b are formed at corner portions of the end surface 16b and the second linkage surface 14b. As described above, by forming the chamfers 24a and 24b of the first linkage portion 13a and the second linkage portion 13b, as shown in FIG. 4, a step-shaped first groove passage 30 is formed on the inner circumferential surface 10a of the cushion ring 10 and a second groove passage 31 is formed on the mounting surface 10d so as to extend in the radial direction and to allow communication between the inner circumferential surface 10a and the outer circumferential surfaces 10b of the cushion ring 10.

The first groove passage 30 and the second groove passage 31 have a function of discharging muddy water etc. trapped between the piston rod 2 and the cushion ring 10 to the outside of the cushion ring 10. More specifically, the muddy water that has flown into a gap between the piston rod 2 and the cushion ring 10 from the contact surface 10c of the cushion ring 10 is guided downwards from the chamfer 20 through the first groove passage 30 of the inner circumferential surface 10a and is discharged to the outside of the cushion ring 10 through the second groove passage 31 of the mounting surface 10d.

By also forming chamfers 25a and 25b on the first end surface 12a and the second end surface 12b of the main body portion 12, respectively, it is possible to form the first groove passage 30 and the second groove passage 31 so as to have a larger size.

The chamfers 24a and 24b need not be formed on all corner portions of the first linkage portion 13a and the second linkage portion 13b, and the chamfers 24a and 24b should be formed at least on the corner portions of the first linkage portion 13a and the second linkage portion 13b facing against the outer circumferential surface of the piston rod 2 and the annular flat-surface portion 6c of the stopper portion 6a of the rod head 6.

Next, the operation of the cushion ring 10 is described.

Attachment of the cushion ring 10 to the shock absorber 100 is performed by mounting the cushion ring 10 around the outer circumference of the piston rod 2 by linking three ring segments 11 via the linkage portions 13, and providing the cushion ring 10 on the annular flat-surface portion 6c of the stopper portion 6a of the rod head 6.

As the shock absorber 100 is contracted to the stroke end, the cushion ring 10 is compressed between the main body portion 3a of the cylinder head 3 and the stopper portion 6a of the rod head 6, and thereby, collision between the cylinder head 3 and the rod head 6 is prevented. By fitting the groove portion 15a to the ridge portion 15b, the first linkage portion 13a and the second linkage portion 13b of the neighboring ring segments 11 of the cushion ring 10 are overlapped in the axial direction of the cushion ring 10 and linked such that their relative movement in the radial direction of the cushion ring 10 is restricted. In addition, of the linkage portions 13 formed on both ends of the main body portion 12 in the circumferential direction of the ring segments 11, the first linkage portion 13a on the one end is linked to the top side of the second linkage portion 13b of the adjacent ring segments 11, and the second linkage portion 13b on the other end is linked to the bottom side of the first linkage portion 13a of the adjacent ring segments 11. As described above, the neighboring ring segments 11 are firmly linked via the linkage portions 13. Therefore, even when the compression loading is applied to the cushion ring 10 between the cylinder head 3 and the rod head 6, the desired repulsive force is generated while keeping the neighboring ring segments 11 linked.

When the shock absorber 100 is used over a long period of time, the working oil in the cylinder 1 and the gas in the gas chamber may leak out to cause a drop in the vehicle height, and thereby, the cushion ring 10 may be damaged due to frequent application of the compression loading between the cylinder head 3 and the rod head 6. However, even in a case in which the cushion ring 10 is damaged, it is possible to dismount the cushion ring 10 from the piston rod 2 by splitting the cushion ring 10. As described above, it is possible to replace the cushion ring 10 with a new cushion ring 10 without disassembling the shock absorber 100.

According to the embodiment mentioned above, the advantages described below are afforded.

Because the cushion ring 10 is configured to have the annular shape by linking the plurality of ring segments 11 in the circumferential direction, in a case in which the cushion ring 10 is damaged and needs to be replaced, it is possible to dismount the cushion ring 10 from the piston rod 2 by splitting the cushion ring 10. Therefore, it is possible to replace the cushion ring 10 with ease. As described above, because the shock absorber 100 needs not to be disassembled when the cushion ring 10 is replaced, it is possible to replace the cushion ring 10 even in a state in which the shock absorber 100 is installed on the vehicle.

In addition, by fitting the groove portion 15a to the ridge portion 15b, the first linkage portion 13a and the second linkage portion 13b of the neighboring ring segments 11 are overlapped in the axial direction of the cushion ring 10 and linked such that their relative movement in the radial direction of the cushion ring 10 is restricted. Therefore, even when the cushion ring 10 is subjected to the compression loading between the cylinder head 3 and the rod head 6, the cushion ring 10 generates the desired repulsive force while keeping the neighboring ring segments 11 linked.

In addition, it is possible to discharge the muddy water trapped between the piston rod 2 and the cushion ring 10 to the outside of the cushion ring 10 through the first groove passage 30 and the second groove passage 31 that are formed by the chamfers 24a and 24b of the first linkage portion 13a and the second linkage portion 13b linking the neighboring ring segments 11.

In addition, in a case in which the cushion ring 10 gets dirty and needs to be cleaned, it is possible to clean the cushion ring 10 with ease by removing the cushion ring 10 from the piston rod 2 by splitting the cushion ring 10.

In addition, in a case in which the shock absorber 100 is used for a damp truck, because the size of the shock absorber 100 is increased, and the outer diameter and the weight of the cushion ring 10 is increased, productivity of the cushion ring 10 is deteriorated. However, because the cushion ring 10 is constituted of the plurality of ring segments 11, it is possible to manufacture the cushion ring 10 by manufacturing lighter and smaller ring segments 11 and linking these ring segments 11. Therefore, it is possible to improve productivity of the cushion ring 10.

Next, a modification of the above-mentioned embodiment will be described.

Figure 5:
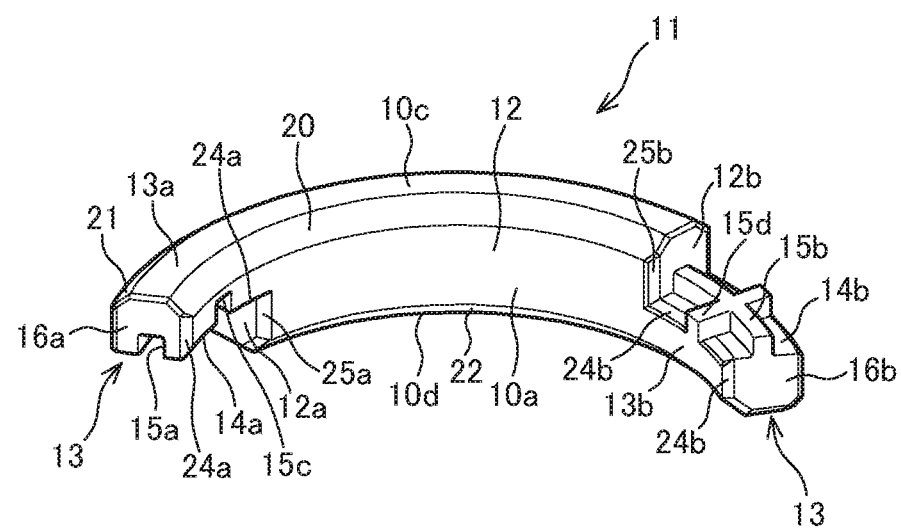
FIG. 5 is a perspective view showing a modification of the ring segments.

(1) In a modification shown in FIG. 5, in addition to the groove portion 15a and the ridge portion 15b, a groove portion 15c (a second groove portion) is formed on the first linkage surface 14a so as to extend in the radial direction, and a ridge portion 15d (a second ridge portion) is formed on the second linkage surface 14b so as to extend in the radial direction. Neighboring two ring segments 11 are linked by fitting the groove portion 15a to the ridge portion 15b, and at the same time, by fitting the groove portion 15c to the ridge portion 15d. As described above, because the neighboring two ring segments 11 are linked by being fixed in the circumferential direction and also being fixed in the radial direction, it is possible to effectively prevent detachment of respect ring segments 11 even when the compression loading is applied to the cushion ring 10 between the cylinder head 3 and the rod head 6.

Figure 6:
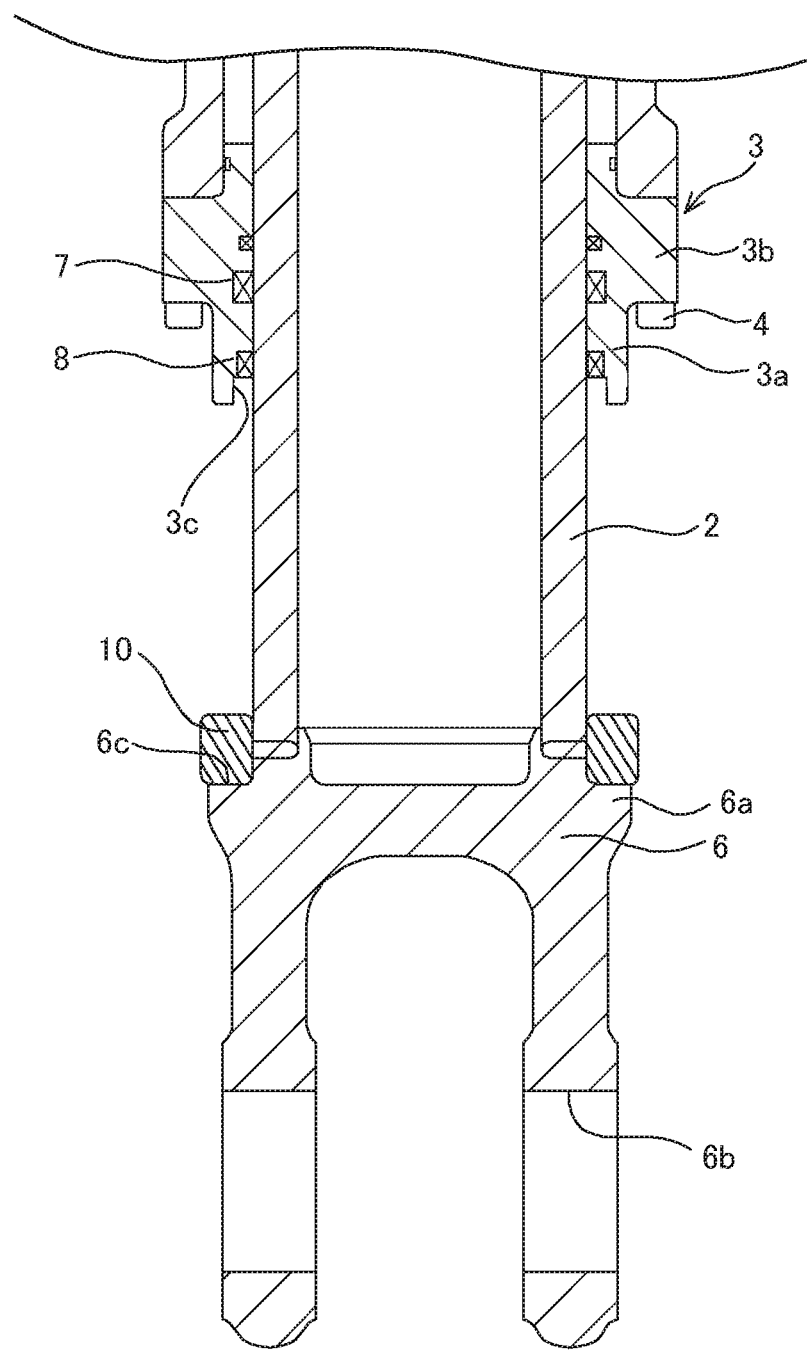
FIG. 6 is a partial sectional view of the cylinder device according to a modification of the embodiment of the present invention.
Figure 7:
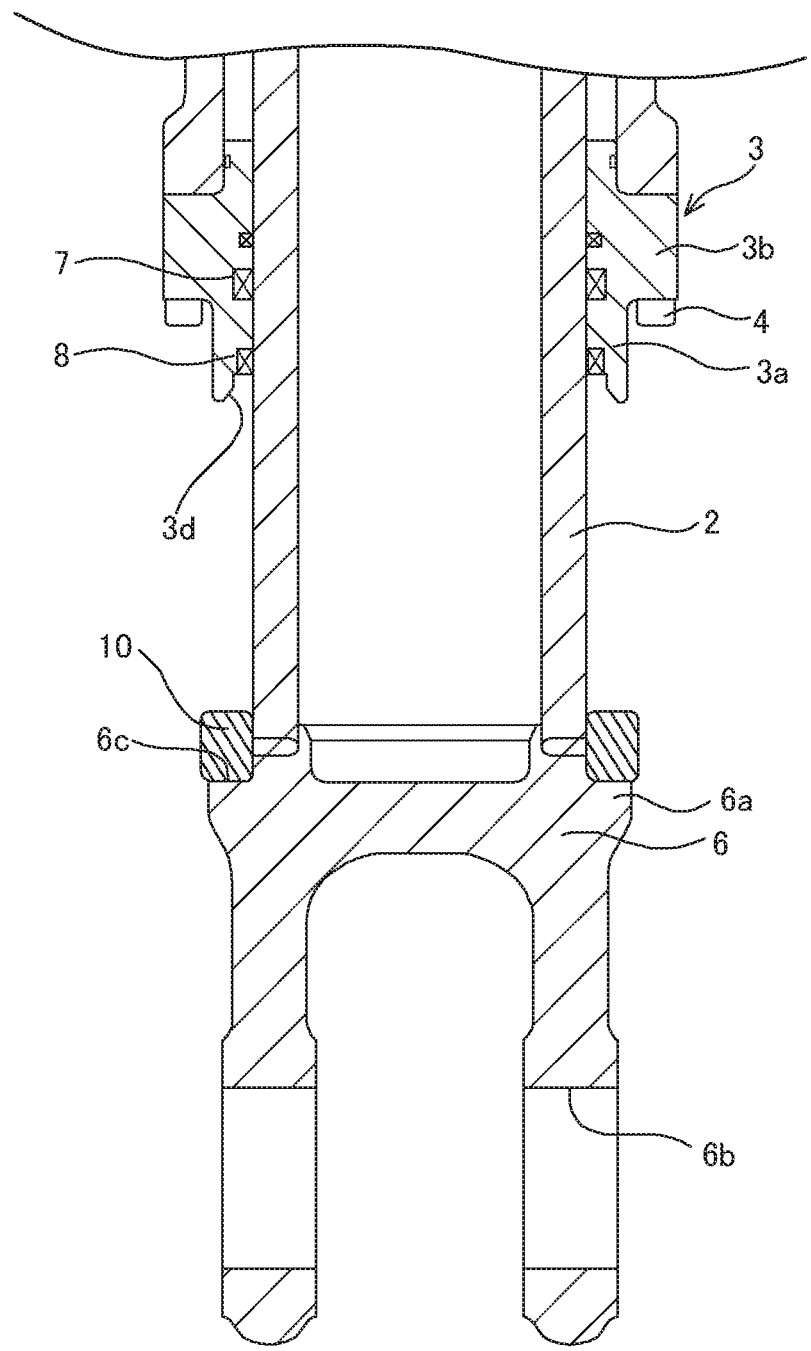
FIG. 7 is a partial sectional view of the cylinder device according to a modification of the embodiment of the present invention.

(2) In a modification shown in FIG. 6, on the end surface of the main body portion 3a of the cylinder head 3 with which the cushion ring 10 is brought into contact, an annular groove portion 3c is provided so as to be arranged at the inner side of the end surface. By providing the annular groove portion 3c on the cylinder head 3, because, when the compression loading is applied to the cushion ring 10 between the cylinder head 3 and the rod head 6, the force component of the compression loading is generated towards the inside of the cushion ring 10, and at the same time, deformation of the cushion ring 10 into the inside of the groove portion 3c is allowed, it is possible to prevent deformation of the cushion ring 10 towards the outside and to prevent detachment of the respective ring segments 11. In a modification shown in FIG. 7, on the end surface of the main body portion 3a of the cylinder head 3 with which the cushion ring 10 is brought into contact, an annular tapered portion 3d is provided so as to be arranged at the inner side of the end surface. With such a configuration, it is possible to achieve operational advantages similar to those of the groove portion 3c.

(3) When the compression loading is applied to the cushion ring 10 between the cylinder head 3 and the rod head 6, in order to prevent detachment of the respective ring segments 11 by outward-stretch of the cushion ring 10, an annular band may be wrapped around the outer circumferential surface of the cushion ring 10.

(4) In the above-mentioned embodiment, the case in which the cushion ring 10 is constituted of the three ring segments 11 is described. However, the number of the ring segments 11 constituting the cushion ring 10 is not limited to three, and two ring segments 11 or four or more ring segments 11 may constitute the cushion ring 10.

(5) In the above-mentioned embodiment, the description is given as followings: the neighboring ring segments 11 are linked in the state in which the end surface 16a of the first linkage portion 13a of the one ring segment 11 faces against the second end surface 12b of the main body portion 12 of the other ring segment 11 such that there is almost no gap, and in the state in which the first end surface 12a of the main body portion 12 of the one ring segment 11 faces against the end surface 16b of the second linkage portion 13b of the other ring segment 11 such that there is almost no gap. However, in order to discharge the muddy water trapped between the piston rod 2 and the cushion ring 10 to the outside of the cushion ring 10 with ease, gaps may be intentionally formed between the end surface 16a of the first linkage portion 13a and the second end surface 12b of the main body portion 12 and between the first end surface 12a of the main body portion 12 and the end surface 16b of the second linkage portion 13b, respectively.

(6) In the above-mentioned embodiment, the case in which the respective ring segments 11 have the same shape is described. However, the respective ring segments 11 may have different shapes. For example, the length of the main body portion 12 in the circumferential direction may differ among the respective ring segments 11.

(7) In the above-mentioned embodiment, the description is given in the case in which, of the linkage portions 13 formed on both ends of the main body portion 12 in the circumferential direction of the ring segments 11, the first linkage portion 13a on the one end is linked to the top side of the second linkage portion 13b of the adjacent ring segments 11, and the second linkage portion 13b on the other end is linked to the bottom side of the first linkage portion 13a of the adjacent ring segments 11. Instead of this configuration, the linkage portions 13 formed on both ends of the main body portion 12 in the circumferential direction of the ring segments 11 may be configured such that the first linkage portion 13a on the one end is linked to the top side of the second linkage portion 13b of the adjacent ring segments 11, and the second linkage portion 13b on the other end is also linked to the top side of the first linkage portion 13a of the adjacent ring segments 11. In addition, the linkage portions 13 formed on both ends of the main body portion 12 in the circumferential direction of the ring segments 11 may be configured such that the first linkage portion 13a on the one end is linked to the bottom side of the second linkage portion 13b of the adjacent ring segments 11, and the second linkage portion 13b on the other end is also linked to the bottom side of the first linkage portion 13a of the adjacent ring segments 11. In the case in which the ring segments 11 are configured as described above, if the number of the ring segments 11 is an even number, all of the ring segments 11 can have the same shape.

(8) In the above-mentioned embodiment, the description is given in the case in which the contact surface 10c and the mounting surface 10d, which are both end surfaces of the cushion ring 10, have flat surfaces. However, the contact surface 10c and the mounting surface 10d are not limited to the flat surfaces, and they may have a shape that is curved in the radial direction.

(9) In the above-mentioned embodiment, the description is given in the case in which the cylinder device is a shock absorber that is installed in the vehicles. However, the cylinder device may be an actuator that is installed in construction machineries and industrial machineries and that drives a load by extending and contracting by working fluid supplied from a fluid pressure source. In other words, the cushion ring 10 may prevent collision between the cylinder head 3 and the rod head 6 at the stroke end during the contraction of the actuator.

Embodiments of this invention were described above, but the above embodiments are merely examples of applications of this invention, and the technical scope of this invention is not limited to the specific constitutions of the above embodiments.

This application claims priority based on Japanese Patent Application No. 2014-079447 filed with the Japan Patent Office on Apr. 8, 2014, the entire contents of which are incorporated into this specification.

The invention claimed is:

1. A cylinder device, in which a piston rod is inserted into a cylinder so as to be movable back and forth, comprising:
a cylinder head provided on an end portion of the cylinder, the piston rod being slidably inserted through the cylinder head;
a rod head provided on an end portion of the piston rod on a side extending out from the cylinder; and
an annular cushion ring mounted on the piston rod so as to prevent collision between the cylinder head and the rod head at stroke end during contraction of the cylinder device,
wherein the cushion ring is formed by linking a plurality of ring segments in a circumferential direction so as to have an annular shape,
the ring segments have a main body portion and linkage portions formed on both ends of the main body portion in the circumferential direction, the linkage portions linking the neighboring ring segments,
the linkage portions of the neighboring ring segments are mutually overlapped in an axial direction of the cushion ring and linked such that relative movement in both an inward radial direction and an outward radial direction of the cushion ring is restricted,
the linkage portions comprise:
a first linkage portion at a first end of each ring segment, the first linkage portion including a ridge, a first radially-extending surface located radially inward of the ridge and a second radially-extending surface located radially outward of the ridge, the ridge protruding from the first and second radially-extending surfaces; and
a second linkage portion at a second end of each ring segment, the second linkage portion including a radially-extending surface and a groove in the radially-extending surface, the groove having a first wall and a second wall located radially outward from the first wall, and
the linkage portions are linked by fitting the ridge of a first linkage portion of a first ring segment into the groove of the second linkage portion of a second ring segment, such that a first side of the ridge contacts the first wall of the groove and a second side of the ridge contacts the second wall of the groove.

2. The cylinder device according to claim 1, wherein the main body portion and the linkage portions of the ring segments are formed as steps, and the plurality of ring segments are linked via the linkage portions such that both annular end surfaces of the cushion ring have flat surfaces.

3. The cylinder device according to claim 1, wherein an annular groove portion or tapered portion is provided at an inner side of an end surface of the cylinder head, the end surface being brought into contact with the cushion ring.

4. The cylinder device according to claim 1, wherein the rod head has a stopper portion on which the cushion ring is provided, the stopper portion defining the stroke end during contraction of the cylinder device, a chamfer is formed on the linkage portion of the ring segment, and a groove passage is formed by the chamfer on an inner circumferential surface and a mounting surface of the cushion ring, the mounting surface contacting the stopper portion.

5. The cylinder device according to claim 1, wherein the plurality of ring segments have the same shape.

6. The cylinder device of claim 1, wherein the ridge of the first linkage portion includes a first ridge extending circumferentially along the first and second radially-extending surfaces and a second ridge extending radially across the first and second radially-extending surfaces from a radially-inward side of the first linkage portion to a radially outward side of the first linkage portion, the second ridge crossing the first ridge.

7. A cylinder device, in which a piston rod is inserted into a cylinder so as to be movable back and forth, comprising:
a cylinder head provided on an end portion of the cylinder, the piston rod being slidably inserted through the cylinder head;
a rod head provided on an end portion of the piston rod on a side extending out from the cylinder; and
an annular cushion ring mounted on the piston rod so as to prevent collision between the cylinder head and the rod head at stroke end during contraction of the cylinder device,
wherein the cushion ring is formed by linking a plurality of ring segments in a circumferential direction so as to have an annular shape,
the ring segments have a main body portion and linkage portions formed on both ends of the main body portion in the circumferential direction, the linkage portions linking the neighboring ring segments,
the linkage portions of the neighboring ring segments are mutually overlapped in an axial direction of the cushion ring and linked such that relative movement in a radial direction of the cushion ring is restricted, and
wherein an annular groove portion or tapered portion is provided at an inner side of an end surface of the cylinder head, the end surface being brought into contact with the cushion ring.

8. The cylinder device according to claim 7, wherein when the compression loading is applied to the cushion ring between the cylinder head and the rod head, the force component of the compression loading is generated towards an inside of the cushion ring.

9. A cylinder device, in which a piston rod is inserted into a cylinder so as to be movable back and forth, comprising:
a cylinder head provided on an end portion of the cylinder, the piston rod being slidably inserted through the cylinder head;
a rod head provided on an end portion of the piston rod on a side extending out from the cylinder; and
an annular cushion ring mounted on the piston rod so as to prevent collision between the cylinder head and the rod head at stroke end during contraction of the cylinder device,
wherein the cushion ring is formed by linking a plurality of ring segments in a circumferential direction so as to have an annular shape,
the ring segments have a main body portion and linkage portions, the linkage portions linking the neighboring ring segments, and
the linkage portions of the neighboring ring segments are mutually overlapped in an axial direction of the cushion ring and linked such that relative movement in both an inward radial direction and an outward radial direction of the cushion ring is restricted,
wherein the linkage portions comprise:
a first linkage portion at a first end of each ring segment, the first linkage portion including a first ridge, a first radially-extending surface located radially inward of the first ridge and a second radially-extending surface located radially outward of the first ridge, the first ridge protruding from a center of the first and second radially-extending surfaces, the first ridge extending circumferentially; and
a second linkage portion at a second end of each ring segment, the second linkage portion including a radially-extending surface and a first groove provided in a center of the radially-extending surface, the first groove being U-shaped and the first groove extending in the circumferential direction, and the first groove having a first wall and a second wall located radially outward from the first wall, and
wherein the linkage portions are linked by fitting the first ridge of a first linkage portion of a first ring segment into the first groove of the second linkage portion of a second ring segment, such that a first side of the first ridge contacts the first wall of the first groove and a second side of the first groove contacts the second wall of the first groove, the linkage portions linking the neighboring ring segments.

10. The cylinder device of claim 9,
wherein the first linkage portion includes a second ridge extending radially across the first and second radially-extending surfaces from a radially-inward side of the first linkage portion to a radially outward side of the first linkage portion, the second ridge crossing the first ridge, and
wherein the second linkage portion includes a second groove extending radially across the first and second radially-extending surfaces from a radially-inward side of the second linkage portion to a radially outward side of the second linkage portion, the second groove crossing the first groove.

* * * * *